(12) United States Patent
Ding et al.

(10) Patent No.: US 6,839,380 B1
(45) Date of Patent: Jan. 4, 2005

(54) ROBUST DETECTION FOR EMBEDDED SIGNALING

(75) Inventors: Yinong Ding, Plano, TX (US); Anand G. Dabak, Richardson, TX (US); Edwin R. Cole, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 551 days.

(21) Appl. No.: 09/638,221

(22) Filed: Aug. 14, 2000

Related U.S. Application Data

(60) Provisional application No. 60/154,575, filed on Sep. 17, 1999.

(51) Int. Cl.[7] ............................................. H04B 1/69
(52) U.S. Cl. ....................... 375/149; 375/140; 375/147
(58) Field of Search ........................... 375/130, 140, 375/147, 148, 149, 363, 364, 365, 366, 368, 143, 150, 152; 701/213, 215; 342/357.06, 357.19; 340/539.13

(56) References Cited

U.S. PATENT DOCUMENTS

| | | | | |
|---|---|---|---|---|
| 5,493,588 A | * | 2/1996 | Lennen | ........................ 375/343 |
| 5,524,127 A | * | 6/1996 | Petranovich | ................. 375/368 |
| 6,314,129 B1 | * | 11/2001 | Sunwoo et al. | .............. 375/149 |
| 6,603,803 B1 | * | 8/2003 | Hatch | .......................... 375/150 |

* cited by examiner

Primary Examiner—Young T. Tse
Assistant Examiner—Qutbuddin Ghulamali
(74) Attorney, Agent, or Firm—W. James Brady, III; Frederick J. Telecky, Jr.

(57) ABSTRACT

This patent disclosure describes an effective synchronization technique for an embedded signaling system based on direct sequence spread spectrum technology. The technique provides an approach to robust detection of information codes embedded in an audio signal which is subject to undergoing such processes as re-recording of the material onto a different media, and conversions from digital to analog form and from analog to digital form. The technique is useful in preventing the embedded information from being corrupted or obscured by pirates via signal distortion operations including D/A and A/D conversions or by legitimate users in artistic processing of the material. The technique according to one embodiment of the present invention includes obtaining a timing error estimate in the process of synchronization by estimating the initial sampling rate/timing error by peak picking and by restoring the correct timing by sample interpolation after synchronization.

11 Claims, 2 Drawing Sheets

ROBUST DETECTION FOR EMBEDDED SIGNALING

This application claims the benefit of provisional application Ser. No. 60/154,575 filed Sep. 17, 1999.

FIELD OF INVENTION

The invention relates to detection of embedded signals.

BACKGROUND OF THE INVENTION

The proliferation of digitized media has created a pressing need for copyright protection and enforcement schemes. One of such schemes is to embed copyright information into the digital materials to be protected. Such embedded signaling systems should meet some basic requirements. First of all, the embedded signal should be unobtrusive, i.e., its presence should not interfere with the work being protected. In the case of embedding data into audio signals, this means that the embedded signal should be inaudible. That is, the composite signal (the audio and the embedded data) should not be readily distinguishable from the original audio signal by listening. Secondly, the embedded data should be robust, and any attempt to remove or obscure the data would result in noticeable signal quality degradation.

Among various techniques which have been applied for embedded signaling, the spread spectrum communications theory based technique has received a great amount of attention because of its superior resistance to a variety of attacks, intention or unintentional signal distortions which include data compression, low-pass and high-pass filtering, re-sampling, requantization and digital-to-analog and analog-to-digital conversions. In spread spectrum communications, a narrow-band signal is transmitted using a much larger bandwidth such that the signal energy present in any single frequency is imperceptible. In an embedded signaling system, an audio signal is viewed as a communication channel, and the embedded data is viewed as a signal that is transmitted through it. Therefore, the embedded signal decoder behaves like the receiver in a communications system. It is well known that in all spread spectrum systems, code synchronization is necessary because the code is the key to despreading the desired information and to spreading any undesired signals. The coded data embedded in an audio signal must be accurate in both its code pattern position in time and its rate of chip generation with respect to the decoder's reference code. In practice, however, this required time accuracy is not always available, especially when the data-embedded audio signal has gone through some of the common signal processing/distortion processes mentioned above.

An embedded signaling system is described by Robert D. Preuss, et al., in U.S. Pat. No. 5,319,735 entitled "Embedded Signaling." This patent is incorporated herein by reference.

SUMMARY OF INVENTION

In accordance with one embodiment of the present invention, a method for restoring the original sampling rate of incoming data is provided by obtaining timing error estimate in the process of synchronization acquisition and verification, and restoring the correct timing by sample interpolation after synchronization lock.

In accordance with another embodiment of the present invention, the initial sampling rate/timing error is estimated by peak picking.

DESCRIPTION OF PREFERRED EMBODIMENTS

With its main object being to achieve robust detection of embedded data symbols in an audio signal, the present invention provides a novel apparatus for robustly acquiring and maintaining accurate code synchronization in a data-embedded audio signal; and apparatus for implementing such synchronization scheme relatively simply and inexpensively on a programmable digital signal processor (DSP), a dedicated integrated circuit (IC), or a combination of DSP and IC. It should be noted that in this disclosure, the words "detection" and "decoding" are used interchangeably since the detection of the embedded data involves the identification of the embedded data position and the subsequent decoding of them.

Figure 1:
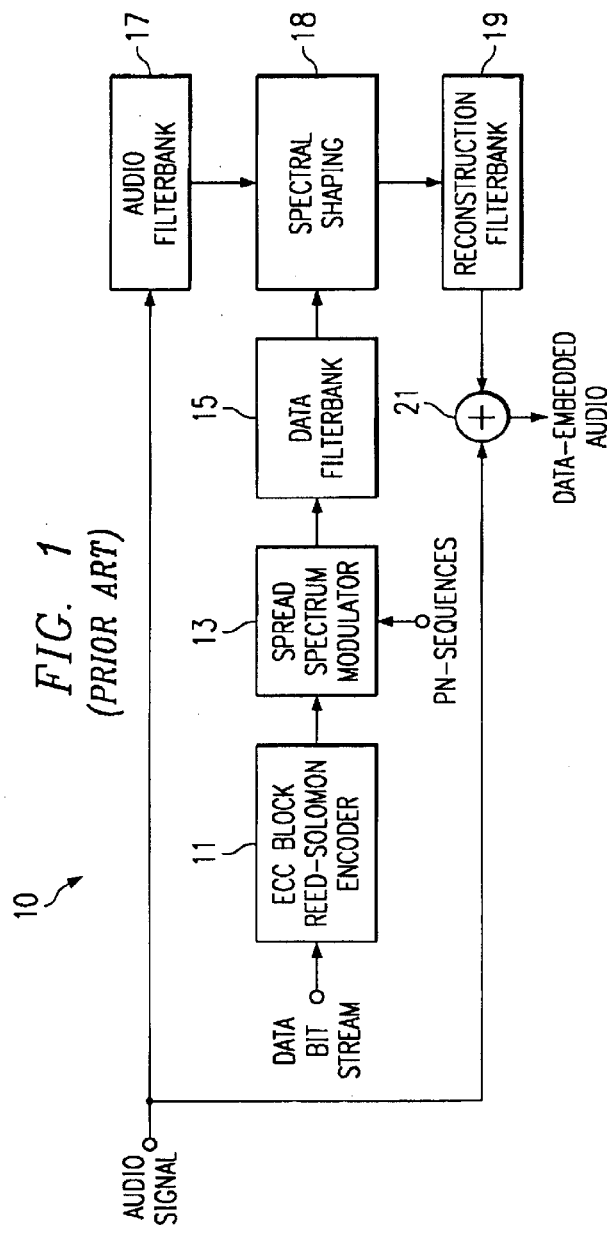
FIG. 1 is a block diagram of the prior art encoder.
Figure 2:
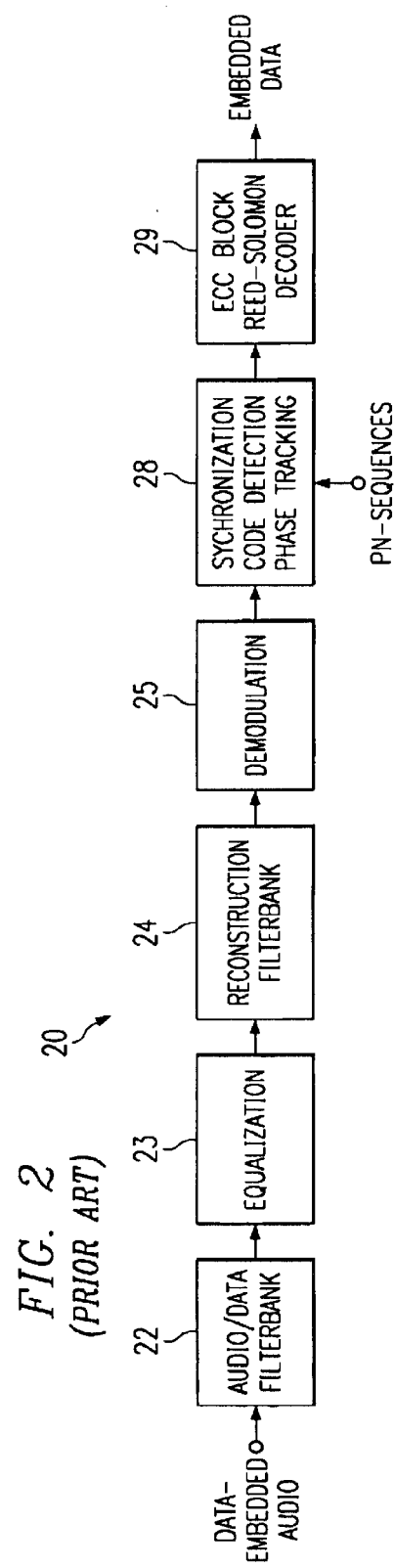
FIG. 2 is a block diagram of the prior art decoder.
Figure 3:
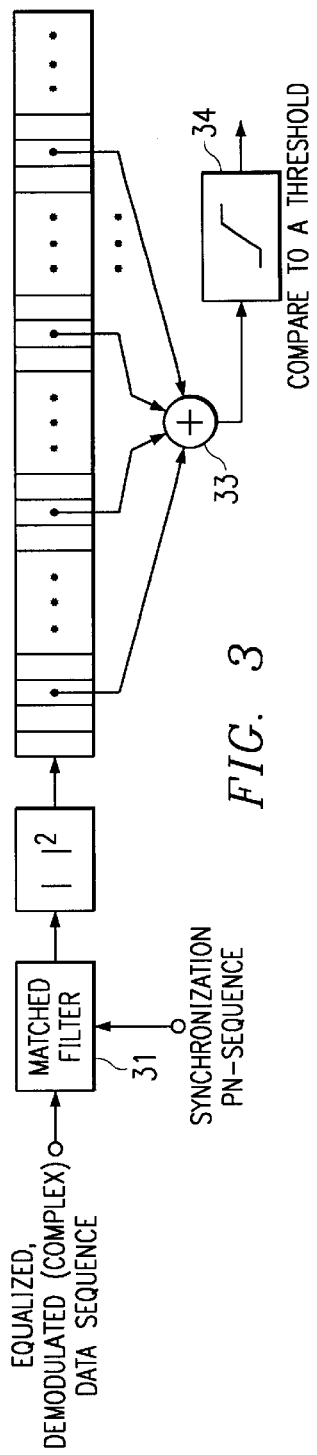
FIG. 3 illustrates the process of acquiring synchronization.

FIGS. 1 and 2 are the block diagrams of the encoder and decoder, respectively, of a prior art spread spectrum-based embedded signaling system of Robert D. Preuss, et al., U.S. Pat. No. 5,319,735. This patent is incorporated herein by reference. In the encoder 10 of FIG. 1, the data bit stream to be embedded is applied to Reed-Solomon error control coding (EEC) 11. The Reed-Solomon encoder produces a block of n code symbols for each block of k information symbols input. For example, the information symbols may comprise an artist's name and title for a musical selection. These information and code symbols can be from a common alphabet of 256 symbols so that each information symbol represents 8 bits or one ASCII character. Values of K=32 and n=51 is an example. The K symbols are retrieved by a Reed-Solomon decoder. The EEC bit stream is spread spectrum modulated at modulator 13 according to the pseudo-random sequences provided. The spread spectrum signal data is filtered at data filterbank 15. Each code symbol is represented by a corresponding pseudo-analog number sequence which is filtered and modified as described, for example, in U.S. Pat. No. 5,319,735. As a consequence, successive code signal segments correspond to successive code symbols which are detectable by means of a matched filter. Each possible input code symbol uniquely corresponds to a particular psuedorandom number sequence. The collection of pseudorandom number sequences is stored in a lookup table so that each successive input code symbol selects the corresponding pseudorandom number sequence which is produced by fetching this pseudorandom number sequence from this lookup table. The numbers within these psuedorandom sequences are referred to a "chips" and the sequences as "chip sequences." This signal undergoes spectral shaping at shaper 18 with filtered audio signal from filter 17. The shaping produces a modified code with frequency component levels which are, at each time instant, a preselected proportion of the levels of the audio signal frequency components in the corresponding frequency range. The spectral shaping is reconstructed at filterbank 19 and summed at summer 21 with the audio signal to provide the data-embedded audio. A more detailed explanation is provided in cited U.S. Pat. No. 5,319,735. From the decoder 20 block diagram of FIG. 2, we see that the audio signal with embedded data passes through audio data filterbank 22, an equalization stage 23, which performs a function the converse of the shaper 18 and then is sent via filterbank 24 to the demodulator 25 followed by the decoding part for synchronization 27 with the PN sequences and decoding at EEC block 29. A typical synchronization process has two tasks: acquiring the synchronization and maintaining the synchronization. The presence of the code signal in the equalized signal is detected by the code signal detector and synchronizer 27 which also determines the requisite initial timing information to locate the successive code symbols. The spread spectrum demodulator 25 performs a function which is the complement of the spread spectrum modulator. The synchronizer 27 provides the initial timing information needed for this function. FIG. 3 illustrates the procedure of acquiring the synchronization used in the synchronization block 27 of decoder 20 in FIG. 2.

In FIG. 3, the equalized and demodulated data are sent to the matched filter 31 whose impulse response is the preselected pseudorandom sequence (PN-sequence) of the synchronization symbols. The output of the matched filter is squared in squarer circuit 32 and sent to taped delay 34. The number of samples between those sent from the taped delay 34 to the adder 33 is determined by the length of the synchronization PN-sequence. Assuming the length of the synchronization PN-sequence is L and the input to the matched filter is the synchronization symbols, the peaks will appear at the output of the matched filter every L samples. The output of the adder 33 is compared with a pre-specified threshold, and a lock is declared when the threshold 34 is exceeded.

This synchronization acquisition scheme works well if the data-embedded audio signal remains in the digital domain and no other digital signal processing operations which may affect the signal sampling rate have been applied to the audio signal. However, this condition is rarely met in reality, since the digital material is often subject to intentional or unintentional signal processing/distortions. These processing operations include re-sampling, digital-to-analog and analog-to-digital conversions, and modulation and demodulation for transmissions. We note that since the decoder for the embedded signaling system works completely in the digital domain, the effects of any inaccuracies in carrier frequency and system clock rate in the aforementioned operations are reflected in the change of the underlying signal sampling rate of the data-embedded signal, which causes errors in code pattern position and the despreading chip rate with respect to the reference code of the decoder. We have noticed that in some cases, the equivalent sampling rate error can be on the order of $10^{-3}$. We also note that when using the synchronization acquisition scheme shown in FIG. 3 under practical system configurations, an initial synchronization can be acquired only when the equivalent sampling rate error is on the order of $10^{-5}$ or better.

Figure 4:
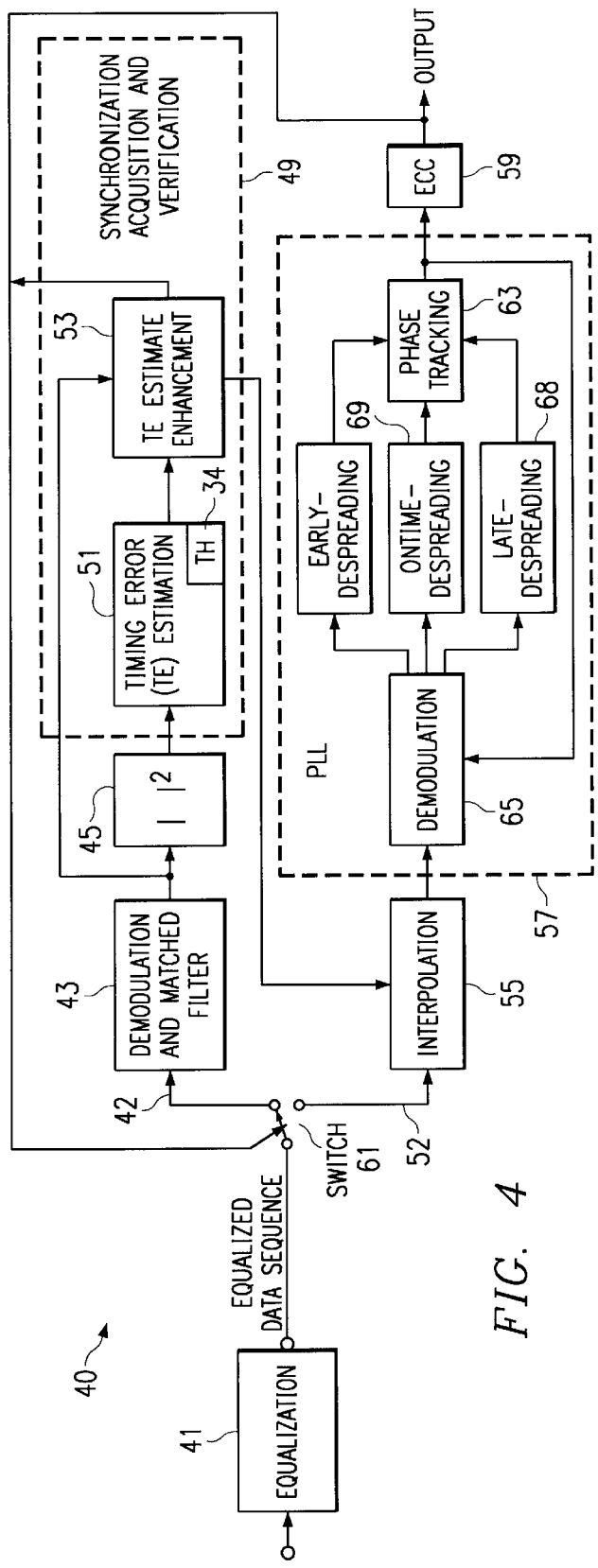
FIG. 4 illustrates a block diagram of the decoder according to one embodiment of the present invention.

An enhanced decoder for embedded signaling systems in accordance with one embodiment of the present invention is illustrated in FIG. 4. The derivation of the decoder is based on the observation that timing error can be estimated by observing the distance between peaks in the matched filter output.

As described earlier, when the input to the matched filter 31 in FIG. 3 are the synchronization symbols, because the impulse response of the matched filter is the time-reversed complex conjugate version of the PN-sequence for the synchronization symbols, there will be magnitude peaks in the output of the matched filter. The distance between those peaks is precisely the length of the PN-sequence. If the signal containing the synchronization symbols has undergone a certain signal distortion process and the equivalent sampling rate of the signal has changed from its original value, the peaks will still appear in the output of the matched filter 31, but the distance between peaks will decrease or increase according to the decrease or increase of the equivalent sampling rate. This shows that the change in the sampling frequency or the timing error caused by signal distortions can be estimated from the output peak information of the synchronization matched filter. This important observation is the starting point for the proposed decoding apparatus.

The equalization stage 41 of the decoder 40 performs all necessary inverse operations to the audio signal in the encoder to obtain the equalized data. The equalized data is then sent to the upper path 42 of the decoder 40 in order to acquire an initial synchronization. The equalized data is demodulated at demodulator and matched filtering 43, squared at squaring circuit 45 and applied to synchronization acquisition and verification system 49. The system 49 includes timing error estimation block 51 and timing error estimate enhancement block 53. In the timing error estimation block 51 (which is coupled to squarer circuit 45), the peaks of the output magnitude of the synchronization matched filter are identified, tested for validity, and their locations and values are stored in memory for future verification. In accordance with one embodiment of the present invention, the decoder is implemented using a digital signal processor or a microprocessor programmed to perform the functions and the memory is that of the system or processor used for the software implementation. These peak locations contain statistical information about the equivalent sampling rate. From them an estimate of the timing error or sampling rate error can be obtained. The disappearance of peaks at the synchronization matched filter output at demodulator and matched filtering 43 indicates the end of synchronization symbols in the incoming equalized data sequence. The verification process then begins by comparing the phases of the peaks with the known synchronization pattern. For a given amount of sampling rate error, we can calculate the extent of the shifts this error has caused to individual peak phases. A grid search for a better estimate around the initial timing error estimate can then be performed, resulting in an enhanced timing error estimate. This operation is conducted in the timing error estimate enhancement block 53 together with the synchronization verification process explained above. A synchronization lock is declared after the sum of the peak magnitudes exceeds a pre-specified threshold 34 (FIG. 4) and the values of the peak vectors are verified to match the synchronization symbol pattern in accordance with the estimated change to the original sampling rate. The threshold comparison is one of the operations done in the timing error estimation block 51 in FIG. 4. At this point, the equalized data sequence is sent to the lower path 52 of the decoder. An interpolation 55 is first performed on the equalized data to restore the correct sampling rate and thus the rate of chip generation. The phase increment of the interpolator is determined by the final estimate of the sampling rate error. A Phase Locked Loop (PLL) 57 comprising a delay-locked loop (DLL) is in place to ensure that the synchronization is maintained. The PLL/DLL is at three different points of early despreading 67, late despreading 68 and on-time despreading 69. Based on the tracking results at phase tracking control 63, the demodulator 65 phase is controlled. The symbol error rate obtained in the error control coding (ECC) block 59 indicates whether or not the synchronization is kept. If the symbol error rate exceeds the error correction capability of the ECC block 59, the decoder 40 is switched at switch 61 to the synchronization search mode to re-acquire the synchronization. The decoder output is provided out of ECC block 59.

We claim:

1. A method for timing recovery/synchronization in an embedded signaling system comprising the steps of:

obtaining a timing error estimate of synchronization acquisition by determining a distance between maximum peak magnitude out of a matched filter output and comparing phases of the maximum peak values with the known synchronization pattern to determine the timing error caused by signal distortions and performing a grid search around the initial timing error estimate;

determining a synchronization lock when the sum of the peak magnitudes exceeds a pre-specified threshold and the values of maximum peak are verified to match the synchronization pattern in accordance with estimated change to sampling rate; and restoring the correct timing by sample interpolation after synchronization.

2. The method of claim 1, including the step of phase tracking comprising the steps of providing a delay-locked loop to ensure synchronization and tracking results of phase error variation trend to determine and predict an amount of phase error.

3. The method of claim 2, wherein when the phase error exceeds a given threshold it is compensated by adjusting the phase of a demodulated signal.

4. The method of claim 3 wherein if the phase error rate exceeds the error correction capability a decoder is switched to the synchronization search mode to reacquire the synchronization.

5. A method for protection of audio signals in digital materials comprising the steps of:

embedding a sequence of code symbols carrying digital protection information in audio signals in digital materials to be protected using a direct sequence spread spectrum encoder and decoding said sequence of code symbols comprising the steps of:

acquiring initial synchronization wherein peaks of an output magnitude of a synchronization matched filter are identified and their locations and values are stored in memory for future verification;

obtaining an initial timing error estimate of synchronization acquisition by determining a distance between maximum peaks out of a matched filter output and comparing phases of the maximum peaks with known synchronization pattern to determine timing error caused by signal distortions and performing a grid search around the initial timing error estimate;

determining a synchronization lock and corrected phase increment when sum of the peak magnitudes exceeds a pre-specified threshold and the values of peak magnitudes are verified to match the synchronization pattern in accordance with an estimated change to the sampling rate;

providing an interpolator;

sending equalized data over a second decoding path to said interpolator when synchronization lock is determined and a corrected phase increment to said interpolator to restore the correct sampling rate and rate of chip generation; and demodulating said equalized data to recover the code symbols.

6. The method of claim 5, including the step of phase tracking comprising the steps of providing a delay-locked loop to ensure synchronization and tracking results of phase error variation trend to determine and predict the amount of phase error.

7. The method of claim 6, wherein when the phase error exceeds a given threshold it is compensated by adjusting the phase of the demodulated signal.

8. The method of claim 5 wherein if symbol error rate exceeds the error correction capability the decoder is switched to the synchronization search mode to reacquire the synchronization.

9. A method for protection of audio signals in digital materials comprising the steps of:

embedding a sequence of code symbols carrying digital protection information in audio signals in digital materials to be protected using a direct sequence spread spectrum encoder and decoding said sequence of code symbols comprising the steps of:

equalizing data;

applying said equalized data over a first synchronization search path to a decoder and a matched filter whose impulse response is a pre-selected pseudo random sequence of synchronization symbols;

acquiring initial synchronization wherein peak of the output magnitude of the matched filter are identified, tested for validity, and their locations and values are stored in memory for future verification;

comparing the maximum phases of the peaks with a known synchronization pattern to perform initial timing error estimate;

performing a grid search for a better estimate around the initial timing error estimate and determining a synchronization lock and corrected phase increment when a sum of the peak output magnitude exceeds a pre-specified threshold and the values of the maximum peak magnitudes are verified to match the synchronization symbol accordance with an estimated change to a sampling rate;

providing corrected phase increment to an interpolator;

sending the equalized data over a second decoding path when synchronization lock is determined to said interpolator with the corrected phase increment to restore the correct sampling rate and rate of chip generation; and demodulating said data to recover the code symbols.

10. The method of claim 9, including the step of phase tracking comprising the steps of providing a delay-locked loop to ensure synchronization and tracking results of phase error variation trend to determine and predict an amount of phase error.

11. The method of claim 10, wherein when the phase error exceeds a given threshold it is compensated by adjusting the phase of the demodulated signal.

* * * * *